No. 821,405. PATENTED MAY 22, 1906.
F. P. ELLIS.
BALING APPARATUS.
APPLICATION FILED APR. 7, 1905.
10 SHEETS—SHEET 1.
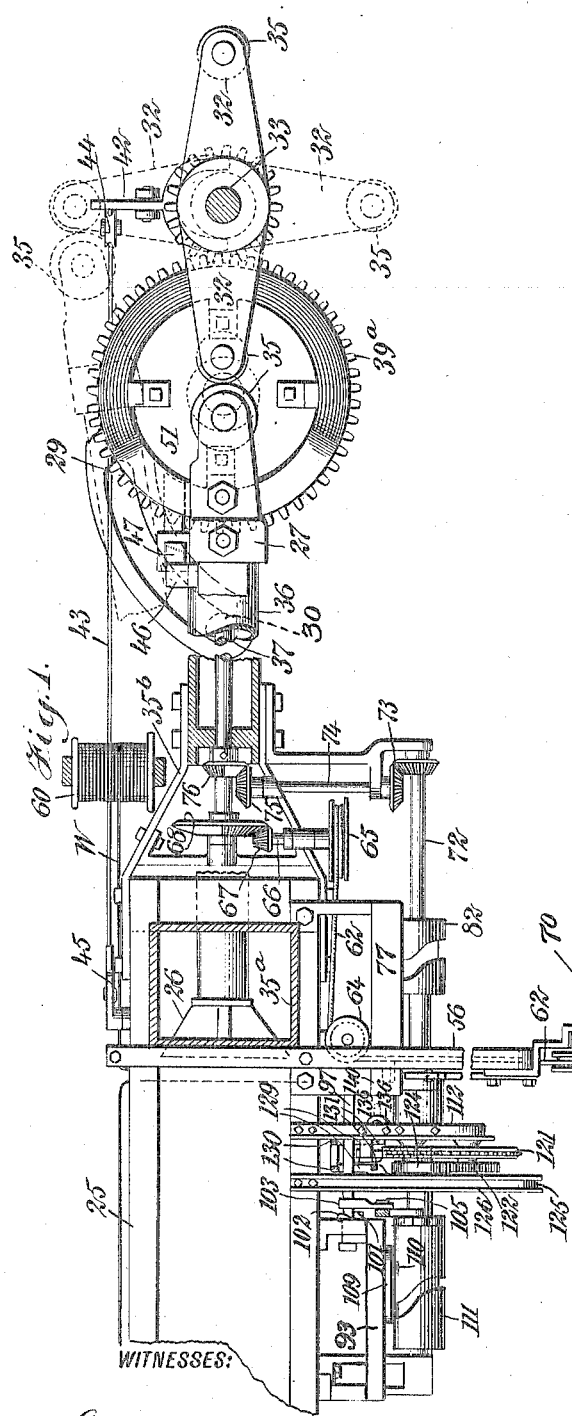
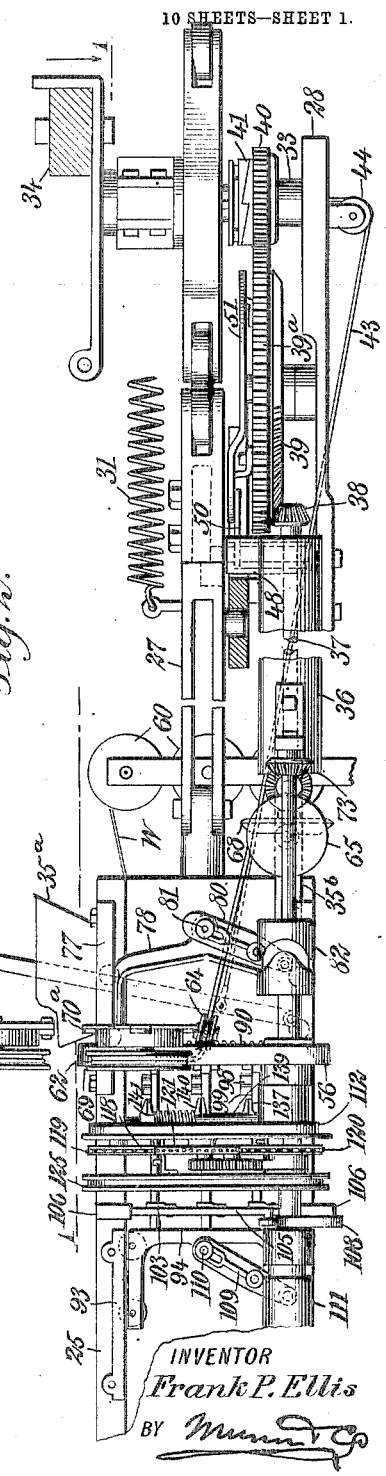
WITNESSES:
INVENTOR
Frank P. Ellis
BY
ATTORNEYS No. 821,405. PATENTED MAY 22, 1906.
F. P. ELLIS.
BALING APPARATUS.
APPLICATION FILED APR. 7, 1905.
10 SHEETS—SHEET 2.
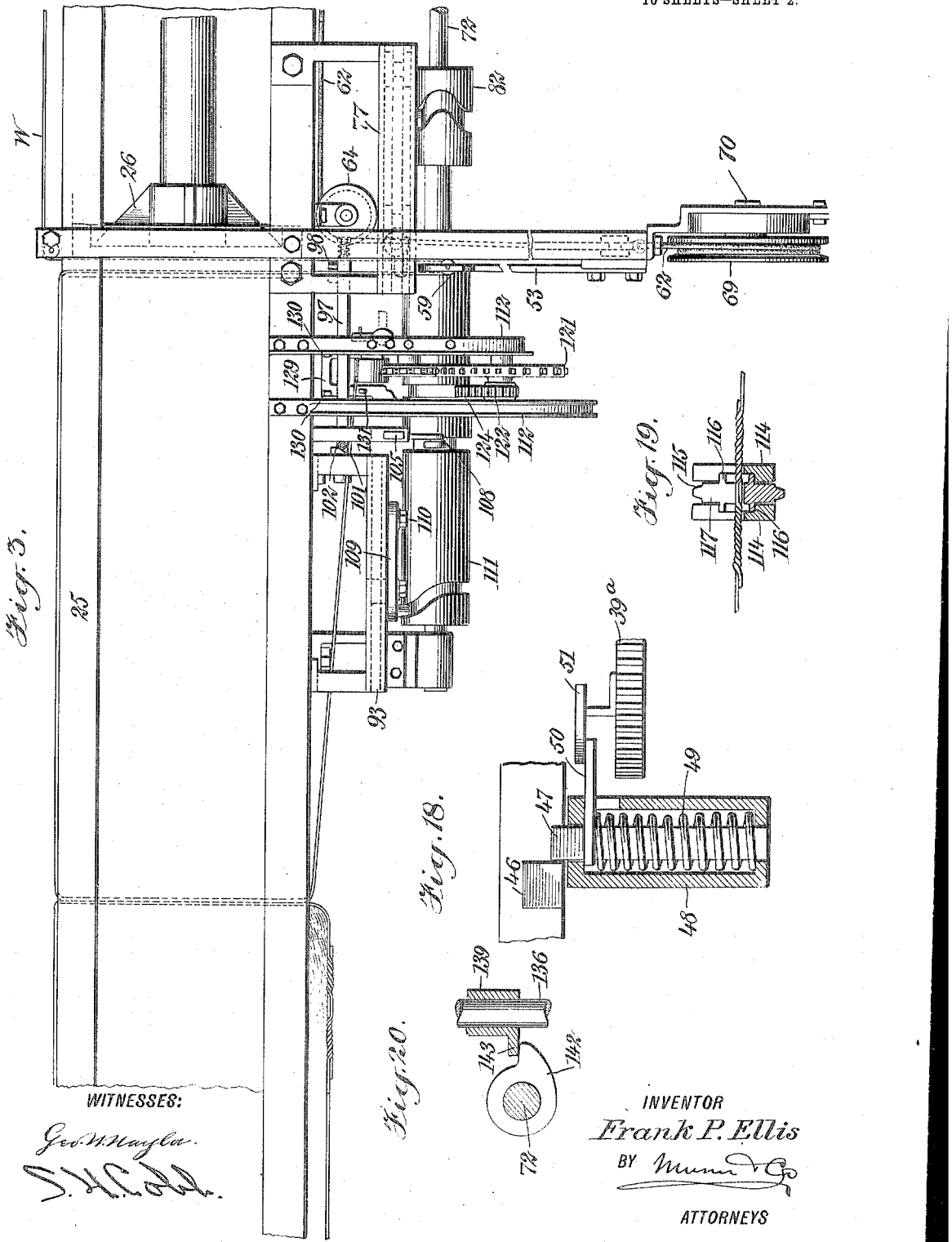
WITNESSES:
INVENTOR
Frank P. Ellis
BY
ATTORNEYS

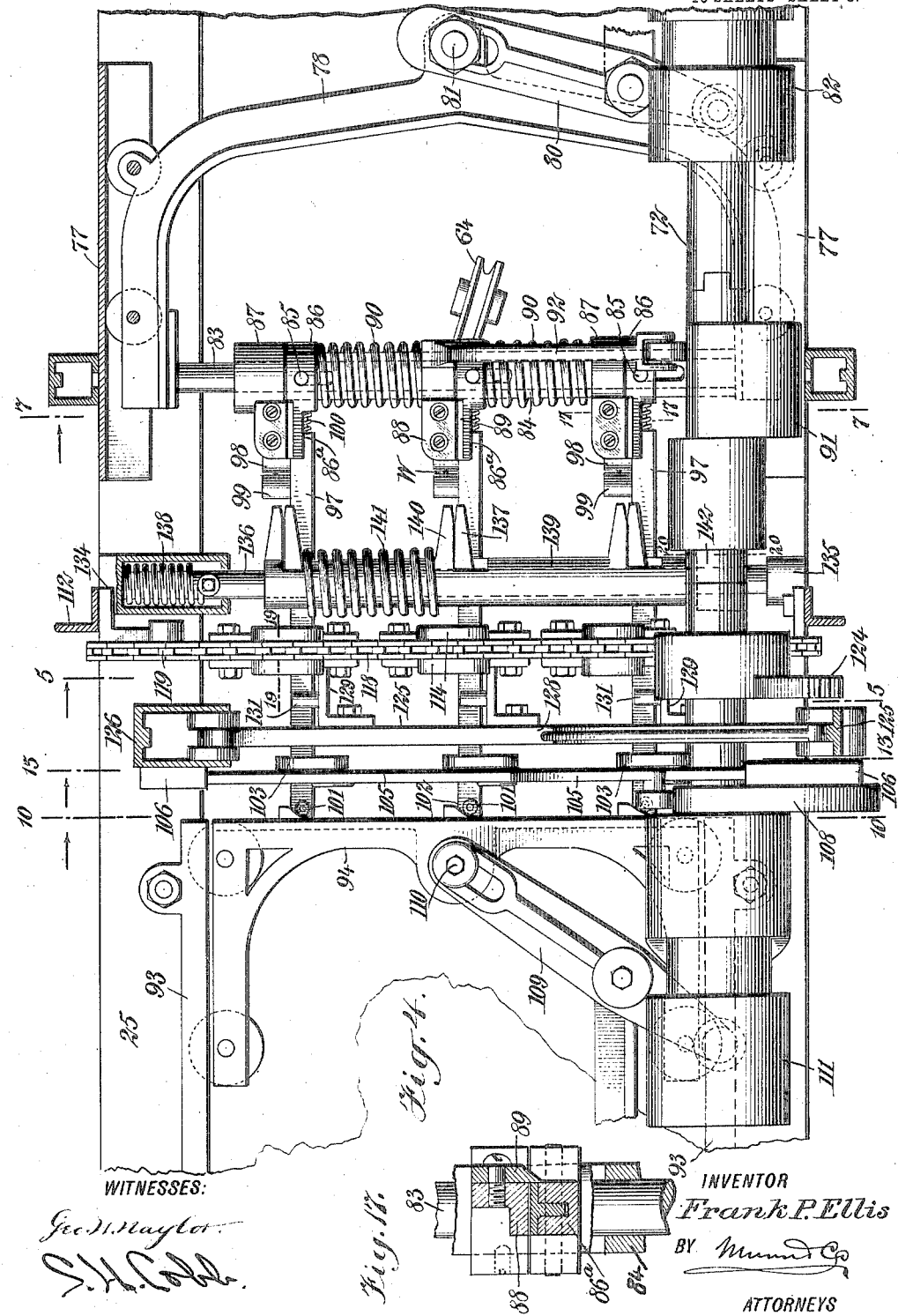

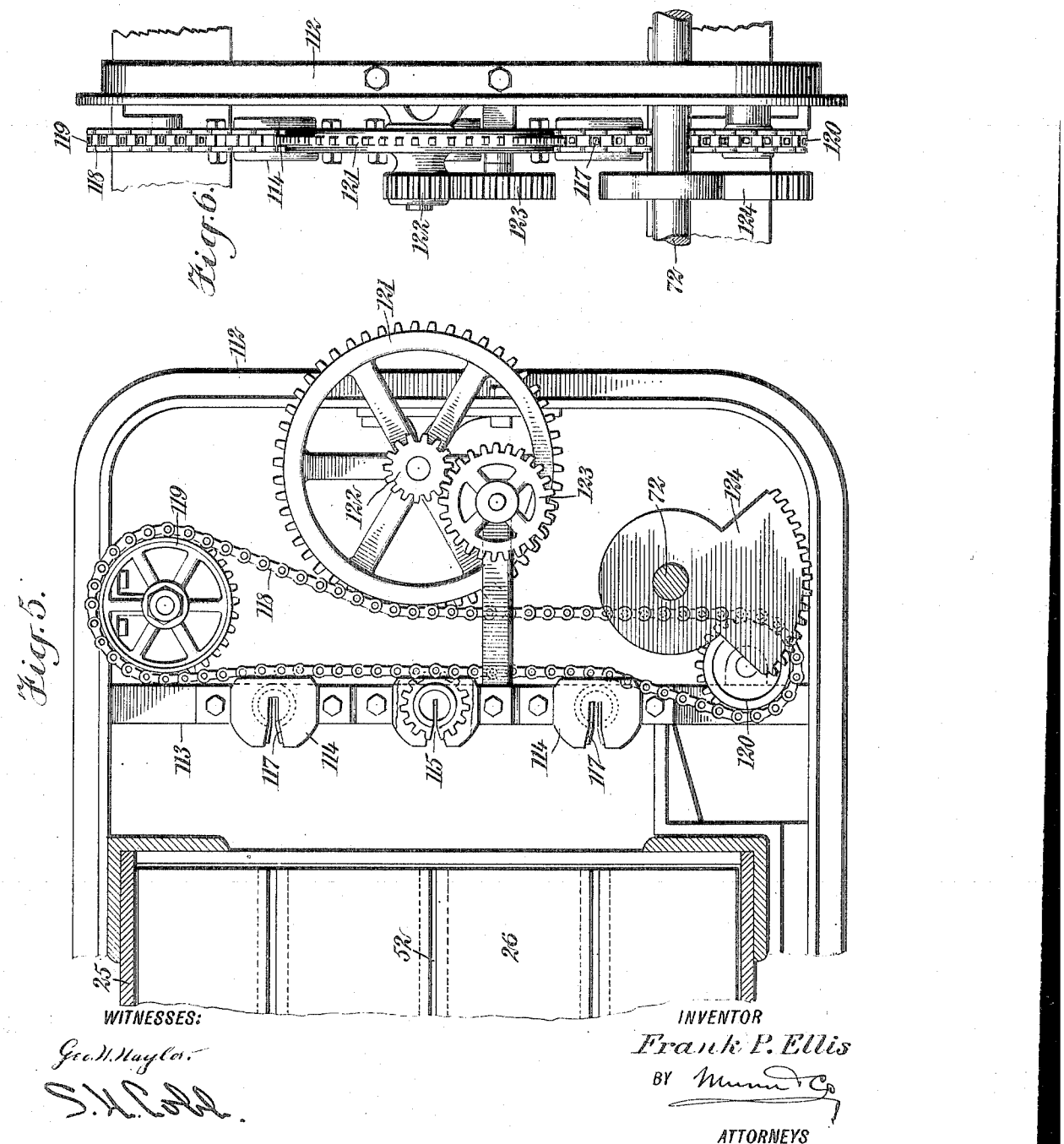

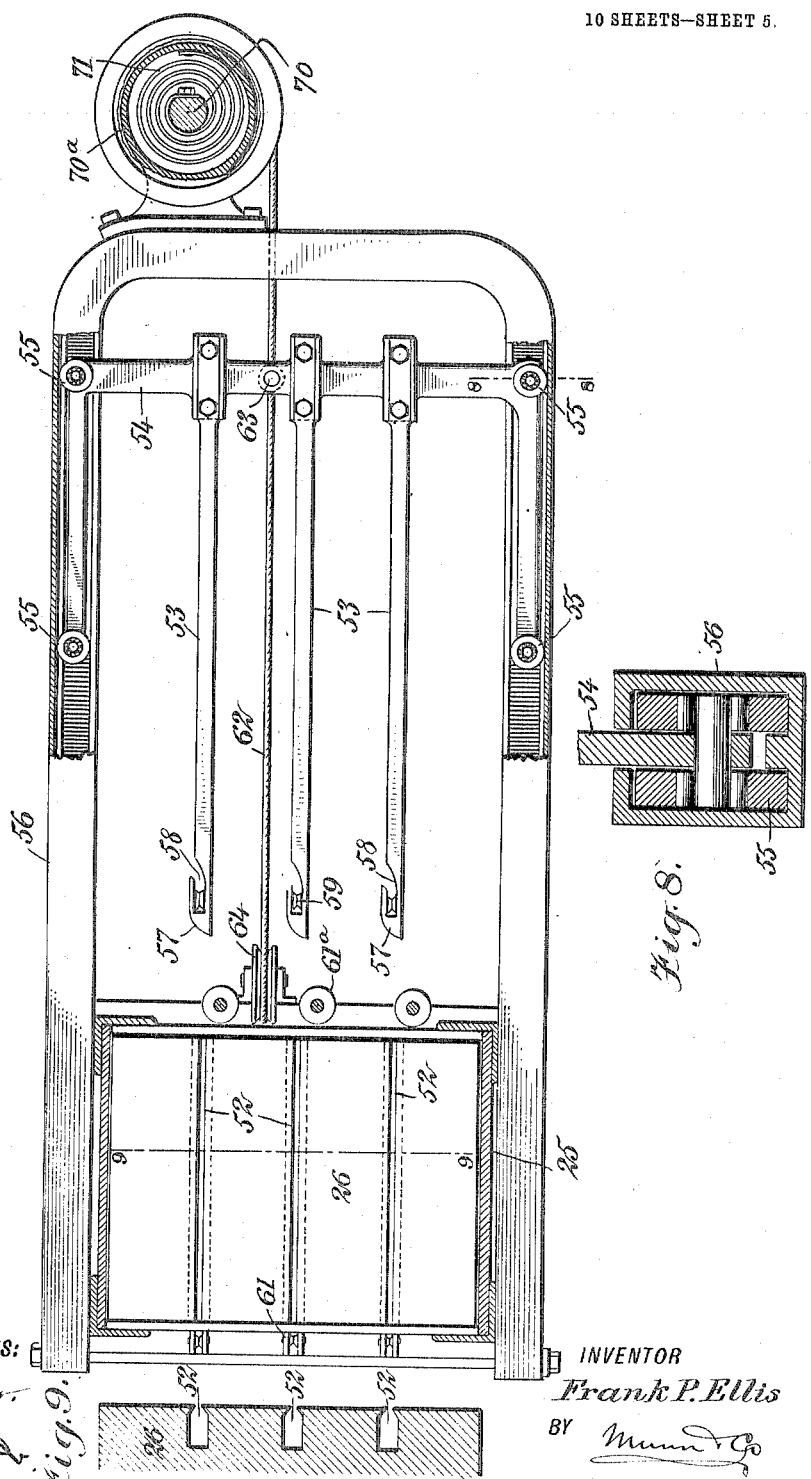

No. 821,405. PATENTED MAY 22, 1906.
F. P. ELLIS.
BALING APPARATUS.
APPLICATION FILED APR. 7, 1905.
10 SHEETS—SHEET 6.
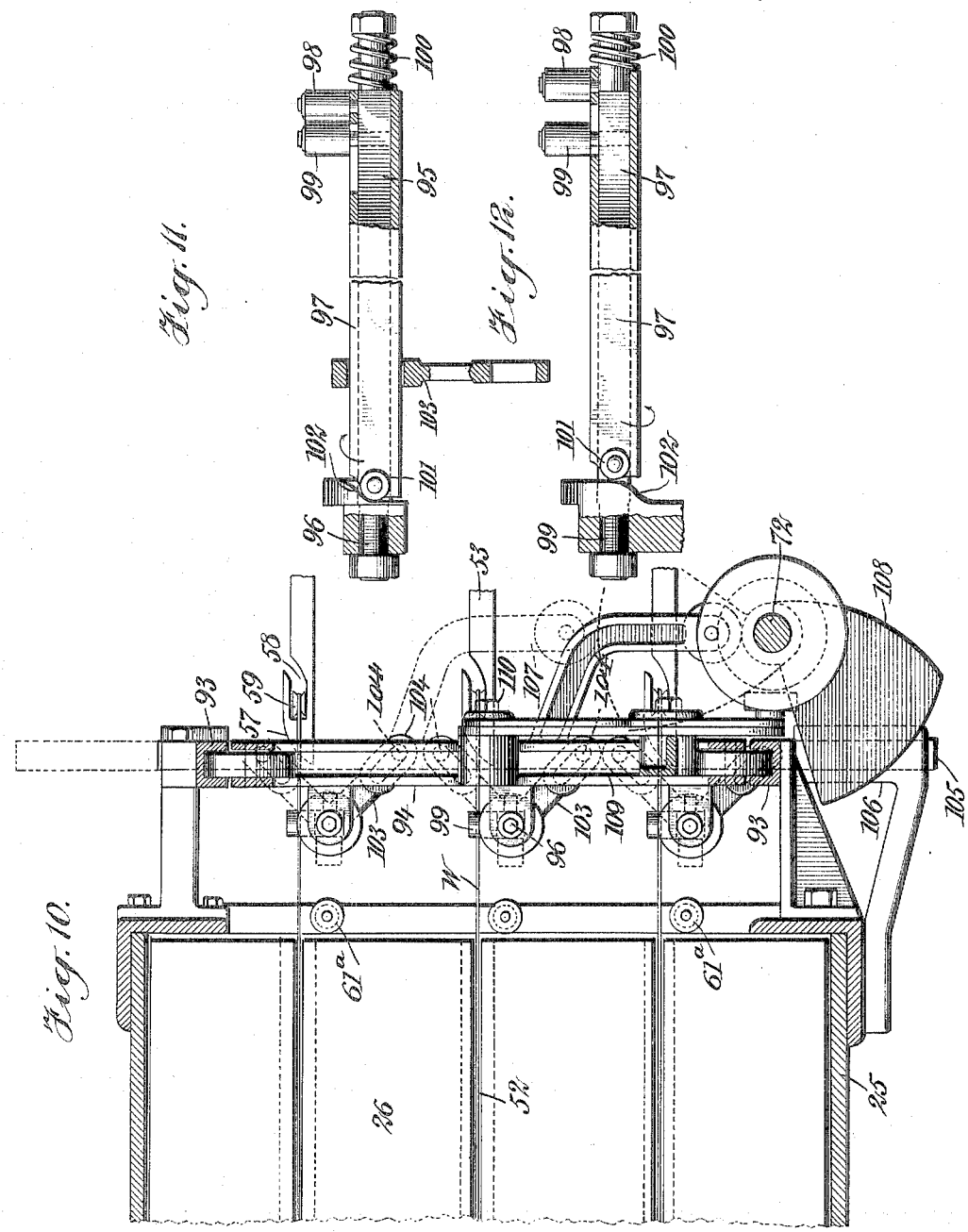
WITNESSES:
INVENTOR
Frank P. Ellis
BY
ATTORNEYS

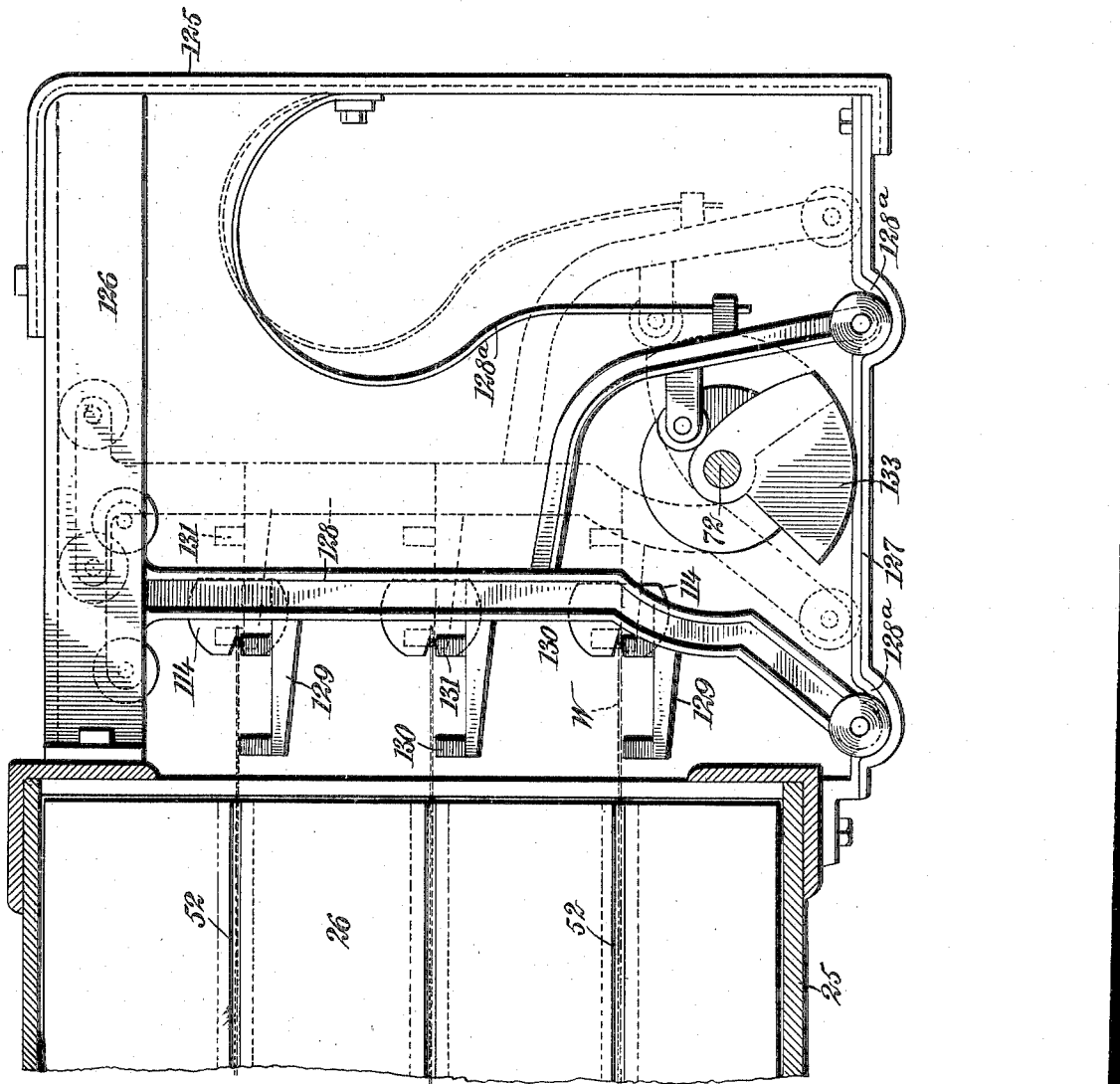

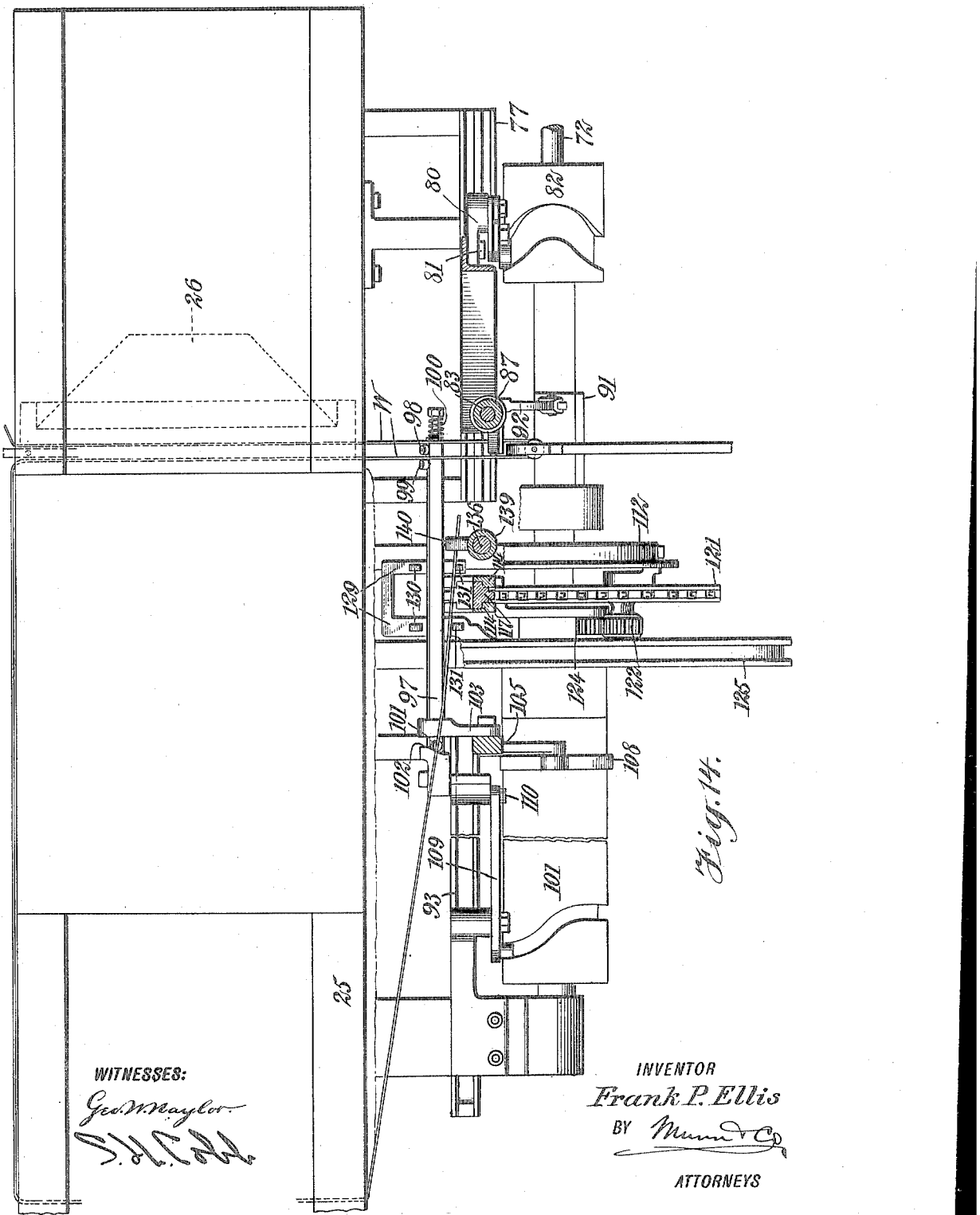

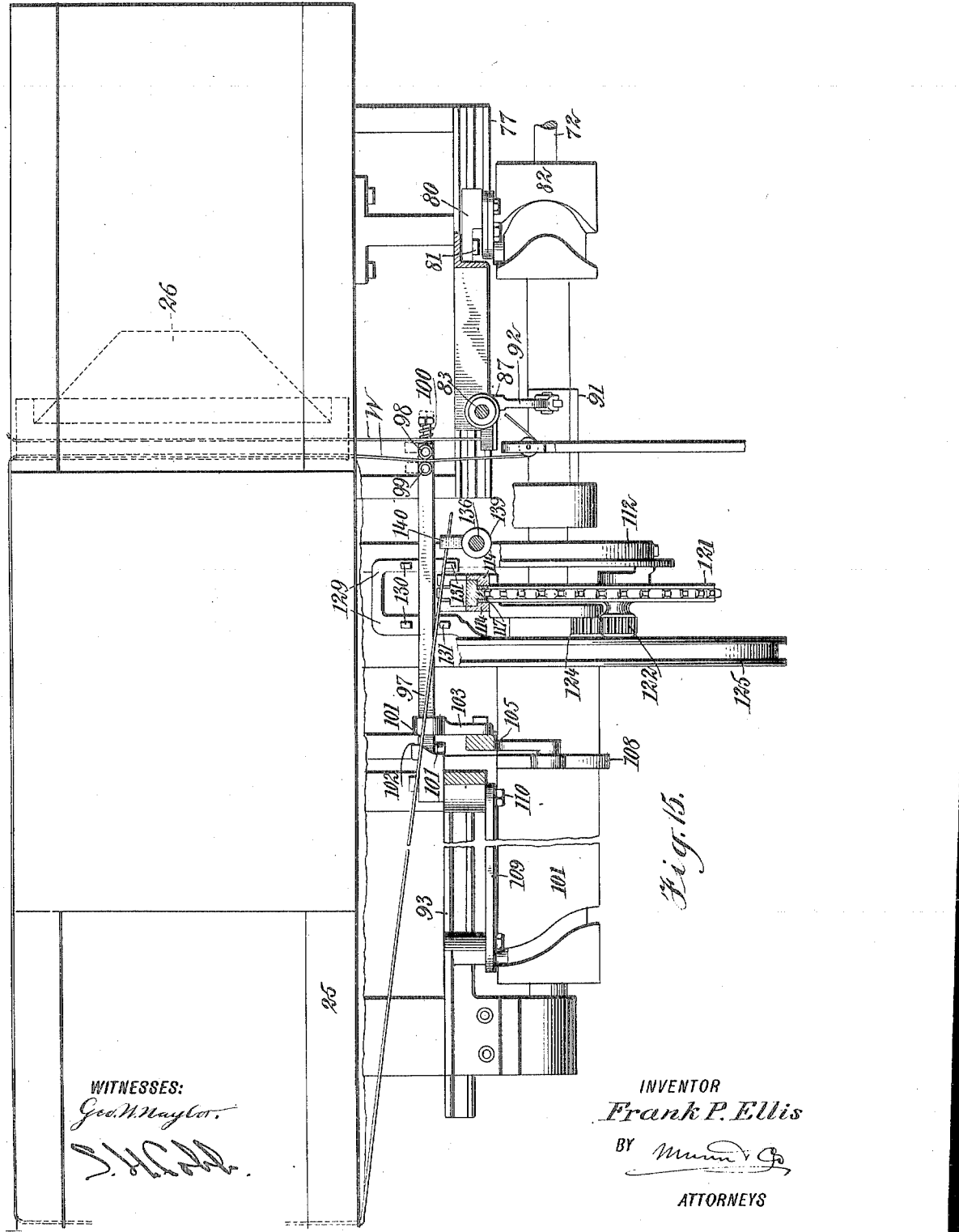

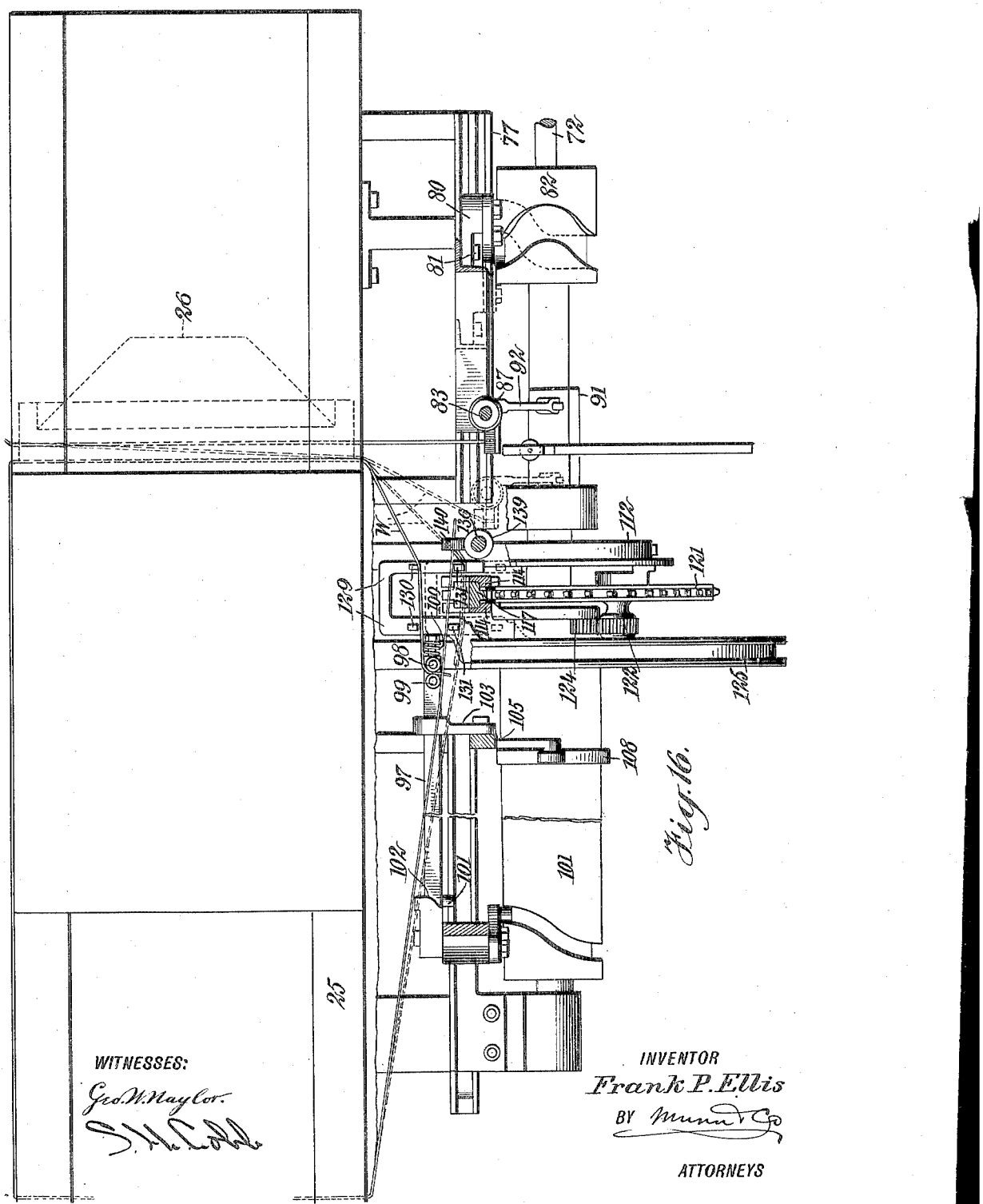

UNITED STATES PATENT OFFICE.

FRANK P. ELLIS, OF MESSER, KANSAS.

BALING APPARATUS.

No. 821,405.　　　Specification of Letters Patent.　　Patented May 22, 1906.

Application filed April 7, 1905. Serial No. 254,336.

*To all whom it may concern:*

Be it known that I, FRANK P. ELLIS, a citizen of the United States, and a resident of Messer, in the county of Cherokee and State of Kansas, have invented a new and Improved Baling Apparatus, of which the following is a full, clear, and exact description.

My invention relates to baling apparatus, and has for its principal object the provision of an efficient machine for compressing and securing or tying bales of material.

It consists in the various features and combinations hereinafter described and more particularly claimed.

Reference is to be had to the accompanying drawings, forming a part of this specification, in which similar characters of reference indicate corresponding parts in all the views.

Figure 1 is a broken top plan view of one embodiment of my invention. Fig. 2 is a side elevation thereof. Fig. 3 is an enlarged top plan view of the baling-chamber and more closely associated elements. Fig. 4 is an enlarged sectional elevation of the tying mechanisms. Fig. 5 is a vertical transverse section on the line 5 5 of Fig. 4, showing the twisting mechanism. Fig. 6 is an end elevation thereof looking from the right in Fig. 5. Fig. 7 is a vertical transverse section on the line 7 7 of Fig. 4, illustrating the drawing mechanism, parts being broken away. Fig. 8 is a transverse sectional detail on the line 8 8 of Fig. 7. Fig. 9 is a similar view on the line 9 9 of Fig. 7. Fig. 10 is a vertical transverse section on the line 10 10 of Fig. 4. Fig. 11 is a broken side elevation of one of the transferring devices. Fig. 12 is a similar view with the engaging rolls separated. Fig. 13 is a vertical transverse section on the line 13 13 of Fig. 4. Figs. 14, 15, and 16 are top plan views of the tying mechanisms, illustrating different successive positions of the elements. Fig. 17 is a sectional detail on the line 17 17 of Fig. 4. Fig. 18 is a similar view of the stop device for the plunger. Fig. 19 is a horizontal sectional detail on the line 19 19 of Fig. 4, showing one of the twisting devices; and Fig. 20 is a transverse sectional detail illustrating more particularly the cam for operating the holding-jaws to which the ends of the ties are finally delivered.

The numeral 25 designates a casing, which furnishes a chamber in which the bale is formed, this preferably having closed top and bottom walls, while the sides are open for a considerable distance to permit the passage of the tie-wires. At the outlet end of the chamber is some suitable tension device (not shown) for retaining the bales until they are forced through by an applied pressure sufficient to properly compress a succeeding bale. Through the opposite or inner end of the casing operates a head or plunger 26, which has pivotally connected to it a rod 27, resting upon guides carried by a supporting-frame 28 and moving between stops 29 and 30, which limit its travel. A spiral spring 31, connecting the rod and frame, serves to normally hold this operating-rod against the stop 29. The rod is moved in the opposite direction by a pair of arms 32 32, extending from a vertical driving-shaft 33, mounted in bearings in the frame 28 and rotatable by a sweep 34 or from any desired source of power. The ends of the arms and the coöperating end of the rod may be provided with rolls 35 to diminish the frictional engagement of the parts. At the inner end of the casing, through its top wall, is an opening to which delivers a hopper $35^a$, receiving the material to be baled.

Joining the casing and the frame 28, it being shown as fixed to a frame $35^b$, projecting from the extremity of the former, is a connecting member or tube 36, in which a main actuating-shaft 37 is mounted to rotate. The outer end of this actuating-shaft has fast upon it a bevel-pinion 38, which meshes with a mutilated gear 39, carried by a shaft journaled in an upright position in the frame 28. This shaft also has fast upon it a spur-gear $39^a$, which is engaged by a pinion 40, mounted loosely upon the driving-shaft 33. The pinion 40 may be held against downward movement on the driving-shaft by a collar fixed to it and carries one element of a clutch 41, the other member of which is splined upon the driving-shaft and may be moved into or out of engagement with the gear member by a lever 42, fulcrumed upon the frame 28. From this lever a flexible member or cord 43, running over suitably-situated grooved rolls 44, extends to a hand-lever 45, fulcrumed upon the side of the bale-casing. It is possible that the feed to the hopper may miss a charge or that said charges have been too small to make a bale of the desired size. In this case the clutch allows the operator to disconnect the tying mechanism from the plunger, so that it may make an additional independent stroke.

Means is provided for retaining the plunger in position with the bale under compression during the tying operation, which may comprise a projection 46 from one side of the operating-rod, which is engaged by a pin or stop member 47, movable in a casing 48, rising from the frame 28. Within this casing is a spiral spring 49, which contacts at its upper end with a projection 50, extending through a slot in the side of the casing and acting to hold the stop-pin normally above the casing in the path of the operating-rod. With the projection 50 coacts a cam-plate 51, mounted upon the upper side of the gear 39$^a$. This plate is of such contour that during the forward movement of the plunger the stop-pin is held down out of the path of the rod; but when the projection 46 has passed the pin it may rise to prevent rearward movement.

In the forward or acting face of the plunger are formed transverse slots 52, (here shown as three in number,) which are to permit the passage of needles or drawing members 53, mounted upon a carrier 54, the entrance of the needles into the slots occurring when the plunger is in its forward position. Rolls 55, here shown as journaled upon the carrier by means of antifriction-bearings, operate in ways formed in the upper and lower members of a frame 56, which extends across the bale-casing above and below it and for a considerable distance at one side thereof. Each needle has formed upon its inner end an inclined point 57, at the inner side of which is a hooked eye or recess 58, having journaled within it a roll 59, rotatable in horizontal planes. The inclined ends of the needles contact with tie-wires W, carried in coils upon reels 60, mounted to rotate upon the frame just at the inner side of the hopper. Rolls 61, situated in line with the ends of the needles when these are at their inward extremes of movement, guide the wires as they are drawn from the reels through the plunger-slots, while rolls 61$^a$ at the opposite side of the bale-casing support the needles during their travel. The wires are forced over the needle ends and caught by the eyes to be drawn through the slots upon the reverse movement of the needles. To secure the desired travel of the needle-carrier, a cord or flexible operating member 62 is connected by a clamp 63 to the outer side of the carrier. From the clamp the cord passes inwardly about a guide-roll 64 and then over a drum 65, fixed upon a shaft 66, which is rotated by means of a bevel-pinion 67, meshing with a mutilated bevel-gear 68 upon the shaft 37. In the opposite direction the cord runs from the clamp over a hollow drum 69, mounted to rotate about a shaft 70, fixed to the frame 56. Within a casing 70$^a$ and attached to it and to the shaft is a spiral spring 71, which exerts its tension to coil the cord about the drum, thus holding the needle-carrier normally in its extreme outward position.

Journaled in suitable bearings and extending parallel to the side of the bale-casing opposite the hand-lever 45 is a counter-actuating or cam shaft 72, which is connected by bevel-gearing 73 with a transverse shaft 74. This latter shaft has at its inner extremity a bevel-gear 75, meshing with a mutilated gear 76 upon the actuating-shaft 37. This gear 76 and its companion gear 68 each have a sufficient number of teeth to move the needle-carrier to its withdrawn position and to rotate the cam-shaft to the proper extent to perform the tying operations.

Opposite channel-bars 77 77, secured to the bale-casing near its top and bottom upon the side adjacent to the shaft 72, furnish ways for a carrier 78, which may have rolls operating therein to reduce the friction. Fulcrumed upon a bracket projecting from the bale-casing is a lever 80, having at one end a slot to receive a projection 81 from the carrier 78, while at its opposite end is shown a roll operating in a groove in a cam 82, fixed to the shaft 72. The rotation of the cam oscillates the lever and reciprocates the carrier 78 for a purpose which will be hereinafter stated. In the carrier is fixed a vertical spindle 83, which has surrounding it a tubular member or sleeve 84, in which are vertical slots to receive pins 85, projecting from the spindle. These pins are three in number, they corresponding to the tie-wires, which have been illustrated. Fast upon each pin is a collar 86, surrounding the sleeve and carrying a fixed jaw 86$^a$, the outer edge of which may serve as a ledger-blade. Collars 87, secured about the sleeve adjacent to those numbered 86, have fixed to them jaws 88, and fixed to the outer side of each of these last-named jaws is a blade or cutter 89, projecting over the fixed jaw. To secure the normal contact of the jaws, springs 90 90 surround the sleeve between the lower and central collar 87 and press at their upper ends against the corresponding collars 86. During the movement of the needles these jaws are separated from one another by a cam 91, which engages a roll mounted upon the end of an arm 92, depending from the middle collar 87. At this time the jaws lie in the path of the needles, each of which draws a loop of wire from the corresponding reel, with one strand lying between the jaws, as is best seen in Fig. 14 of the drawings. The movement of the cam then permits the closing of the jaws by the springs, they gripping in a portion of the strand shown at the right of that figure, while the cutters simultaneously sever the other strand from it.

Coöperating with the gripping and cutting means is a device for transferring the loose end of the wire into a position overlapping the other end of the length of wire previously cut, this being preparatory to twisting to form the tie. Secured upon the bale-casing are channel-bars 93 93, in which run rolls of a carrier 94. Upon the side of this carrier toward that of the gripping and cutting mechanism are three transferring-bars 95, which, as illustrated, are square in cross-section and have cylindrical shanks 96 mounted to turn in the carrier. Surrounding each of these bars is a tubular member or sleeve 97, which is also square and has at its outer extremity a pin or projection about which is rotatable an engaging-roll 98. In the face of the sleeve adjacent to this engaging roll is a slot through which projects a similar pin fixed to the bar and serving to support a companion engaging roll 99. These rolls may be held normally in contact by a spring 100, which lies between the end of the sleeve and a nut or enlargement upon a cylindrical extension from the bar. They may be separated by a roll 101, rotatable upon one side of the inner extremity of the sleeve and which contacts with a cam-face 102, formed upon the carrier. This separating movement may be accomplished and the rolls simultaneously revolved to lower them, so that they may be brought beneath the strand of wire by an arm 103, surrounding each sleeve. This arm has a squared opening through which the sleeve may move and at its outer end a slot to receive a pin 104, projecting from a vertically-movable rod 105, mounted in guides 106 upon the bale-casing. From one side of the rod 105 extends an arm 107, having a roll contacting with a cam 108, fast upon the shaft 72. The raising of the rod by the cam simultaneously rotates the rods and sleeves, lowering the engaging rolls. Then as the rolls 101 of the latter run over the cam-faces 102 the sleeves are slipped through the openings in the arms 107 along the rods to open the engaging rolls. As this is occurring the carrier is being moved in its ways to bring the engaging rolls beneath the strands of wire which they are to seize by means of a lever 109, mounted upon the bale-casing and having a slot into which extends a projection 110 from the carrier. The opposite end of the lever may be provided with a roll entering a groove in a cam 111, rotatable with the shaft 72. After the engaging rolls have been moved in this manner beneath the wire the cam 108 permits them to assume their initial vertical position. As they are thus revolved their rolls 101 run back down the cam-faces and the engaging rolls seize the strands of wire, Fig. 15, this occurring just before they are cut. The carrier 94 after the cutting operation again travels to its outward position, transferring the strands to the positions shown in full lines in Fig. 16.

Projecting from the bale-casing between the carriers 78 and 94 is a frame 112, supporting a vertical cross-bar 113, which includes three pairs of separated bearing-plates 114 114, in which bearing-plates are opposite slots 115 to receive the ends of the wires to be twisted. In each pair of plates are alined recesses to receive hubs or projections 116 of wheels or twisting members 117, which have slots movable into registration with those of the bearing-plates. Each of the wheels is provided with peripheral teeth which project outside the bearing-plates at the edges opposite the slots, where they are engaged by a chain 118, carried by sprocket-wheels 119 120, journaled at the upper and lower portions, respectively, of the frame 112. At the outer side of the frame is rotatably mounted a larger sprocket-wheel 121, which has fixed to a shaft a spur-pinion 122, meshing with a gear 123, rotatable upon an arm of the frame. Upon the cam-shaft 72 is fixed a segmental gear 124, the teeth of which as they revolve engage those of the gear 123 and through the interposed gearing and chain rotate the wheels 117 sufficiently to properly twist the wires.

Means for securing the engagement and disengagement of the wires and the twisting mechanism will now be described.

Adjacent to the frame 112 is a similarly-mounted frame 125, in the upper portion of which is a deep way in a channel member 126, while the lower member 127 has a comparatively shallow way. Rolls of a carrier 128 move in these ways, and those at its lower portion may be received by depressions 128$^a$. From the inner side of the carrier project three pairs of horizontal arms 129 129, which are shown as connected by a cross-bar, giving them a general U shape. Upon each arm is an upwardly-extending engaging projection 130, these lying at the inner extremities of the arms adjacent to the bale-casing. Outside these near the carrier are similar projections 131. To normally maintain the carrier in its inward position, at which time the lower rolls are within the depressions 128$^a$, a spring, here shown as of the leaf type, is secured at one end to the vertical bar of the frame 125, while its inner and lower end engages the carrier. To move the carrier outwardly against the tension of the spring, a cam 133 is fastened upon the shaft 72 and coöperates with a roll rotatable upon an arm projecting from the carrier. The ends of the wires being in the position illustrated in full lines in Fig. 16, the cam 133 forces the carrier 128 outwardly, and as the rolls ride out of the frame-recesses an upward movement is also imparted to said carrier. This causes the engaging projections 130 to contact first with the inner strands of the wire and then with the outer and to carry parallel portions of them into the slots of the twisting-wheels, this being shown in dotted lines in Fig. 16. The twisting operation is now performed, as has been previously described, and at this time the raised portion of the cam 133 passes its roll, whereupon the spring 132 moves the carrier inwardly. As this occurs the outer projections 131 contact with the twisted wires and draw them from the wheels, and as the carrier-rolls reach the depressions 128ª the carrier sinks to release the wire. This completes the ties.

It is now only necessary to transfer the end of the wire held between the jaws 86ª and 88 to the proper position adjacent to the twisting mechanism for the succeeding tie. Turning in upper and lower bearings 134 and 135, respectively, is a shaft 136, from which project three jaws 137. This shaft is normally held with its jaws extending toward the jaws 86ª and 88 by a spring 138, situated in a casing depending from the bearing 134 and being fixed thereto and to the shaft. About the shaft is a sleeve 139, having slots through which the jaws 137 project, and adjacent to these slots companion jaws 140. A spring 141, surrounding the sleeve and resting against adjacent jaws, forces the companion jaws toward one another. They may be separated by a cam 142, secured upon the shaft 72 and coöperating with a projection 143, carried by the sleeve. After the twisting operation has been completed and the united ties removed therefrom the jaws 137 and 140 are returned by the spring 138 from the position shown in full lines in Figs. 3 and 14 to 16 of the drawings to that illustrated in dotted lines in Fig. 3 and in full lines in Fig. 4 and are separated by the cam 142. The carrier 78 is now advanced by the cam 82 and the outer strands, which during the tying operation have remained clamped between its jaws, are carried between the jaws 137 and 140. The raised portion of the cam 142 now passes the projection 143, and these last-named jaws close upon the wires, whereupon the carrier 78 returns to its initial position. The tension of the wires causes the shaft 136 to turn upon its axis, the jaws and wires assuming the proper position for the succeeding tie.

The general operation of the apparatus may be recapitulated as follows: The material to be baled is supplied through the hopper, the driving-rod of the plunger being held by the spring against its stop and said plunger, therefore, being in its extreme inward position. The rotation of the driving-shaft causes one of the arms and rolls to contact with the roll upon the driving-rod and force the plunger outwardly, urging the material toward the preceding bale to compress it. When the plunger reaches its outward limit of travel, it is locked by the rising of the projection 47, the grooves in its face being in alinement with the guide-rolls for the tie-wires at one side and with the needles at the opposite. The bale being operated upon is surrounded by the wires severed from the preceding ties, these being held between the jaws 137 and 140, as is particularly shown in Fig. 3. The pull of the wires hold the jaws in a position at right angles to the normal against the tension of the spring. When the plunger has been thus locked, the teeth upon the gear 68 have reached the coöperating pinion, drawing the needle-carrier toward the bale-casing. This projects the needles through the grooves in the plunger-head and their inclined ends striking the wires just inside the guide-rolls force them into the recesses. This having been accomplished, the teeth of the gear 68 have passed the pinion and it is released, allowing the springs to exert their tension upon the carrier and draw the needles, with loops of the tie-wires, through the grooves, the wires running over the rolls in the needle-recesses and being drawn off the reels. In the meantime the teeth of the gear 76 have engaged those of its companion gear, rotating the cam-shaft. This will have separated the jaws 86ª and 88, so that the needles pass between them and in drawing out the wires will leave one of the strands of each loop between the jaws. Before these jaws close the transferring-carrier is advanced by the cam 111, and as its engaging rolls approach the wires the cam 108 simultaneously revolves and separates them, so that they assume an open position beneath the outer strands of the wires. The rotation of the cam 108 now permits the engaging rolls to revolve to a vertical position and close upon the strands. At this time the jaws 86ª and 88 close, gripping the inner strands and severing the outer strands, which are retained between the engaging rolls. The cam 111 now draws back the carrier 94, transferring the outer tie ends to the position shown in full lines in Fig. 16 of the drawings, these ends slipping between the rolls. The tie ends now overlap one another in positions adjacent to the twisting-wheels, which are situated with their slots in registration with the slots of the bearing-plates. The carrier 128 is now moved outwardly by the cam 133, and as its rolls rise from the depressions in the lower way the pairs of projections 130 successively contact with the tie ends, drawing parallel portions into the slots of the twisting-wheels. They are there held while the segmental gear 124 comes into mesh with its associated gearing to rotate all the wheels, thus twisting the ends upon one another to form the ties. After the teeth of the segmental gear have passed its pinion the spring of the carrier 128 moves it inwardly, bringing the projections 131 into contact with the ties to remove them from the twisting-wheel slots. The operation upon the bale is then completed. During these steps the severed inner strands of the loops have been held in the grip of the jaws 86ª and 88. These jaws are now moved by the action of the cam 82 upon their carrier toward the jaws 137 and 140, which upon the release of the ends of the ties of the preceding bale have assumed their normal position. (See Fig. 4 and the position in dotted lines in Fig. 3.) As the jaws approach one another those numbered 137 and 140 are separated by the cam 142 and are then released to close upon the strands. Then the jaws 86ª and 88 are opened and return to their initial position. The blank portion of the gear 76 now reaches the teeth of the coöperating gear, and the cam-shaft remains stationary until the succeeding charge has been compressed. To permit this, the stop-pin is lowered by the cam-plate 51 and the driving-rod of the plunger returned by its spring to the position shown in dotted lines in Fig. 1.

Having thus described my invention, I claim as new and desire to secure by Letters Patent—

1. A baling apparatus comprising a casing, a reciprocating plunger therein, a driving-shaft, means for operating the plunger from the driving-shaft, and a locking device for the plunger controlled by the driving-shaft.

2. A baling apparatus comprising a casing, a reciprocating plunger therein, a driving-shaft, means for operating the plunger from the driving-shaft, a locking device for the plunger, and a cam operated by the driving-shaft for operating the locking device.

3. A baling apparatus comprising a casing, a reciprocating plunger, a driving-shaft, connections between the driving-shaft and plunger, a stop coöperating with said connections, and a cam rotatable by the driving-shaft for moving the stop.

4. A baling apparatus comprising a casing, a plunger operating in the casing, tying mechanism, a driving-shaft for operating the plunger situated beyond one end of the casing, gearing connecting the driving-shaft and tying mechanism, a clutch associated with the gearing, a clutch-lever, a hand-lever on the casing, and a flexible operating member connecting the clutch-lever and hand-lever, whereby the tying mechanism can be disconnected from the plunger to permit the latter to make an additional stroke when desired.

5. A baling apparatus comprising a casing, a plunger operating in the casing, tying mechanism, a frame, a driving-shaft for operating the plunger rotatable in the frame, a tubular member connecting the casing and frame, and a shaft extending through the tubular member and being geared to the tying mechanism and driving-shaft.

6. A baling apparatus comprising a casing, a plunger operating in the casing and having a groove across its face, tying mechanism including a needle movable through the plunger-groove, and means for locking the plunger with its groove in alinement with the needle.

7. The combination with a casing and a plunger operating therein, of tying mechanism comprising a tie-engaging needle movable across the casing, a spring for moving the needle in one direction, and power-operating means for moving the needle in the opposite direction.

8. The combination with a casing and a plunger operating therein, of tying mechanism comprising a tie-engaging needle movable across the casing, a spring for moving the needle in one direction, a mutilated gear for moving said needle in the opposite direction, and driving-gearing engaging the mutilated gear.

9. The combination with a casing and a plunger operating therein, of tying mechanism comprising a tie-engaging needle, a carrier for the needle, a flexible member extending from the carrier in opposite directions, and means for exerting tension upon the opposite ends of the flexible member.

10. The combination with a casing and a plunger operating therein, of tying mechanism comprising a tie-engaging needle, a carrier for the needle, a flexible member extending from the carrier in opposite directions, a spring connected with one end of the flexible member, and gearing connected with the opposite end.

11. Tying mechanism comprising tie-drawing means, jaws between which the tie-drawing means pass, one of said jaws being provided with a cutter, and means for operating the jaws, whereby when the jaws are closed one strand will be severed and the other held thereby.

12. Tying mechanism comprising tie-drawing means, separated pairs of jaws, and means for moving one pair of jaws toward the other.

13. Tying mechanism comprising tie-drawing means, separated pairs of jaws, means for moving one pair of jaws toward the other, and means for successively opening the jaws.

14. Tying mechanism comprising tie-drawing means, a plurality of pairs of coöperating jaws, means for separating the jaws, and means for revolving all of said jaws about a common axis.

15. Tying mechanism comprising tie-drawing means, a shaft, a sleeve surrounding the shaft and having an opening, a pin extending from the shaft through the opening, a collar carried by the pin, and coöperating jaws mounted upon the collar and sleeve.

16. Tying mechanism comprising tie-drawing means, a shaft, a sleeve surrounding the shaft and having a slot, a jaw secured to the shaft and extending through the slot, a coöperating jaw carried by the sleeve, and a spring surrounding the sleeve and bearing against the jaw of the shaft.

17. Tying mechanism comprising tie-drawing means, separated pairs of jaws, a rotatable shaft upon which one of the pairs of jaws is mounted, and a spring exerting its tension upon the shaft to turn these last-named jaws toward the companion pair.

18. Tying mechanism comprising tie-drawing means, separated pairs of jaws, one of which is revoluble, means for normally holding said revoluble jaws turned toward the companion pair, and means for separating the revoluble jaws when in their normal position.

19. Tying mechanism comprising gripping members, and a drawing member movable between the gripping members.

20. Tying mechanism comprising gripping members, a cutter carried thereby, and a drawing member movable between the gripping members.

21. Tying mechanism comprising gripping members, a drawing member adapted to engage a double tie-strand and draw one of the strands between the gripping members, and means for grasping the other tie-strand.

22. Tying mechanism comprising gripping members, a drawing member movable between the gripping members adapted to engage a double tie-strand and draw one of the strands between the gripping members, means for cutting the strand at one side of the gripping members, and means for grasping the other strand.

23. Tying mechanism comprising gripping members, one of which is provided with a cutter, a drawing member adapted to engage a double tie-strand and draw the strands between the gripping members, means for operating the gripping members, whereby one strand will be severed and the other held, a twisting device, and means for grasping the severed strand and transferring it into proximity with the twisting device.

24. Tying mechanism comprising gripping members, a drawing member adapted to engage a double tie-strand and draw one of the strands between the gripping members, means for cutting the strand at one side of the gripping members, coöperating jaws separated from the gripping members, and means for moving the strand from the gripping members to the jaws.

25. Tying mechanism comprising gripping members, a drawing member adapted to engage a double tie-strand and draw one of the strands between the gripping members, means for cutting the strand at one side of the gripping members, coöperating jaws separated from the gripping members, and means for moving the gripping members toward the jaws.

26. Tying mechanism comprising gripping members, a drawing member adapted to engage a double tie-strand and draw one of the strands between the gripping members, means for cutting the strand at one side of the gripping members, coöperating jaws separated from the gripping members, means for moving the gripping members toward the jaws, and means for successively opening the jaws and gripping members.

27. Tying mechanism comprising gripping members, a twisting device, and transferring means movable between the gripping members and twisting device.

28. Tying mechanism comprising gripping members, a twisting device, transferring-carriers having engaging portions, and means for moving said engaging portions toward and from one another.

29. Tying mechanism comprising gripping members, a twisting device, transferring-carriers having engaging portions, and means for revolving said engaging portions upon the carriers.

30. Tying mechanism comprising gripping members, a twisting device, transferring-carriers having engaging portions, means for revolving said engaging portions upon the carriers, and means for moving the engaging portions toward and from one another.

31. Tying mechanism comprising gripping members, a twisting device, a transferring-carrier, a rod rotatable upon the carrier, a sleeve movable upon the rod, and engaging portions carried by the rod and sleeve.

32. Tying mechanism comprising gripping members, a twisting device, a transferring-carrier, a rod rotatable upon the carrier, a sleeve movable upon the rod, engaging portions carried by the rod and sleeve, and an operating-arm surrounding the sleeve and through which it is movable.

33. Tying mechanism comprising gripping members, a twisting device, a transferring-carrier, a rod rotatable upon the carrier and being provided with a cam-face, a sleeve movable upon the rod and coöperating with the cam-face, and engaging portions carried by the rod and sleeve.

34. Tying mechanism comprising gripping members, a twisting device, a transferring-carrier, a rod rotatable upon the carrier and being provided with a cam-face, a sleeve movable upon the rod and coöperating with the cam-face, engaging portions carried by the rod and sleeve, and means engaging the sleeve for simultaneously rotating said sleeve and the rod.

35. Tying mechanism comprising gripping members, a twisting device, a transferring-carrier, a rod rotatable upon the carrier, a sleeve movable upon the rod, engaging portions carried by the rod and sleeve, an operating-arm surrounding the sleeve and through which it is movable, and means for reciprocating the carrier.

36. Tying mechanism comprising a twisting device, coöperating jaws for holding the ends of a tie adjacent to the twisting device, and movable means for bringing the tie ends while thus held into coöperation with the twisting device.

37. Tying mechanism comprising a twisting device, coöperating jaws for holding the ends of a tie adjacent to the twisting device, and means movable toward and from the twisting device for bringing the tie ends into and out of coöperation with said twisting device.

38. Tying mechanism comprising a twisting device, means for holding the ends of a tie adjacent to the twisting device, and a carrier movable toward and from the twisting device and having a pluralty of projections for contact with both ends of the tie.

39. Tying mechanism comprising a twisting device, means for holding the ends of a tie adjacent to the twisting device, and a carrier movable toward and from the twisting device and having a plurality of projections for contact with opposite sides of both ends of the tie.

40. Tying mechanism comprising a twisting device, means for holding the ends of a tie adjacent to the twisting device, a carrier movable toward and from the twisting device and having a projection for contact with the tie, and means for raising and lowering the carrier.

41. Tying mechanism comprising a twisting device, means for holding the ends of a tie adjacent to the twisting device, ways provided with a depression, and a carrier movable along the ways in coöperation with the depression and having an engaging projection.

42. Tying mechanism comprising a twisting device, means for holding the ends of a tie adjacent to the twisting device, ways provided with a depression, and a carrier movable along the ways in coöperation with the depression and having engaging projections adapted to contact with opposite sides of the tie.

43. In a baling apparatus, fixed and spaced plates, having alined recesses and slots, a toothed wheel mounted between the plates and having a radial slot, and an endless chain engaging the said wheel.

44. In a baling apparatus, a twisting mechanism comprising fixed and spaced plates having opposite slots, a wheel mounted between the plates and having a radial slot, and means for revolving the wheel, and means for engaging and disengaging the ends of the wire with the twisting mechanism.

45. In a baling apparatus, the combination with the plunger and a tying mechanism, of a driving-shaft, means for operating the plunger from the shaft, a gear-wheel loose on the shaft, a manually-operated clutch for connecting the gear-wheel with the shaft, and intermediate gearing between the said gear-wheel and the tying mechanism.

46. In a baling apparatus, the combination with the plunger and a tying mechanism, of a driving-shaft, arms on the shaft for operating the plunger, a gear-wheel loose on the shaft, a clutch for connecting the gear-wheel with the shaft, means for operating the clutch, and intermediate gearing between the said gear-wheel and the tying mechanism.

In testimony whereof I have signed my name to this specification in the presence of two subscribing witnesses.

FRANK P. ELLIS.

Witnesses:
OTTO S. MOORE,
ALBERT BROWN.